(12) United States Patent
Busser et al.

(10) Patent No.: US 9,021,258 B2
(45) Date of Patent: Apr. 28, 2015

(54) METHOD AND DEVICE FOR TRANSCODING DURING AN ENCRYPTION-BASED ACCESS CHECK ON A DATABASE

(75) Inventors: Jens-Uwe Busser, München (DE); Steffen Fries, Baldham (DE); Angela Schattleitner, Tuntenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 285 days.

(21) Appl. No.: 12/937,765

(22) PCT Filed: Mar. 12, 2009

(86) PCT No.: PCT/EP2009/052893
§ 371 (c)(1),
(2), (4) Date: Oct. 14, 2010

(87) PCT Pub. No.: WO2009/127479
PCT Pub. Date: Oct. 22, 2009

(65) Prior Publication Data
US 2011/0035600 A1 Feb. 10, 2011

(30) Foreign Application Priority Data
Apr. 16, 2008 (DE) .......................... 10 2008 019 103

(51) Int. Cl.
*H04L 29/06* (2006.01)
*H04L 9/00* (2006.01)
(Continued)

(52) U.S. Cl.
CPC ............ *G06F 21/6227* (2013.01); *G06F 21/62* (2013.01); *G06F 2221/2107* (2013.01); *G06F 2221/2149* (2013.01)

(58) Field of Classification Search
CPC . G06F 21/10; G06F 21/6209; G06F 21/6218; G06F 21/62; G06F 21/60; G06F 21/6227; H04L 63/105
USPC ...................... 726/2–5, 7, 26–29; 709/223–6; 707/783–786; 380/277, 281, 44, 45
See application file for complete search history.

(56) References Cited

U.S. PATENT DOCUMENTS

| 6,711,553 B1 | 3/2004 | Deng et al. ...................... 705/57 |
| 6,987,854 B2 | 1/2006 | Maillard ....................... 380/210 |

(Continued)

FOREIGN PATENT DOCUMENTS

| CN | 1541479 A | 10/2004 | ............... H04N 7/16 |
| DE | 69828071 | 11/2005 | ............. H04N 5/913 |
| DE | 102005059992 | 6/2007 | ............. H04N 7/173 |

OTHER PUBLICATIONS

International Search Report and Written Opinion for Application No. PCT/EP2009/052893 (14 pages), Jul. 17, 2009.
(Continued)

*Primary Examiner* — Tae Kim
(74) *Attorney, Agent, or Firm* — King & Spalding L.L.P.

(57) ABSTRACT

A device for transcoding during an encryption-based access check of a client device to a databank, which provides a data set in an encrypted area, has: a unit for assigning a specific access level of the client device and for providing a corresponding first group key of the client device as a function of a registration parameter, wherein the client device is allowed access to a first area, which is encrypted using the first group key, and all areas of the database subordinate to the first area as a function of the assigned access level; a unit for providing a classification result depending on a classification of the data set of the particular area by one of the client devices allowed to access the particular area; and a unit for transcoding the data set and/or a data set key for the data set as a function of the classification result.

21 Claims, 4 Drawing Sheets

(51) Int. Cl.
*G06F 17/30* (2006.01)
*G06F 21/62* (2013.01)

(56) References Cited

U.S. PATENT DOCUMENTS

| | | | |
|---|---|---|---|
| 7,095,854 B1 | 8/2006 | Ginter et al. | 380/233 |
| 7,103,663 B2 | 9/2006 | Inoue et al. | 709/225 |
| 7,395,425 B2 * | 7/2008 | Nakano et al. | 713/163 |
| 7,792,300 B1 * | 9/2010 | Caronni | 726/1 |
| 7,818,414 B2 * | 10/2010 | Kennedy | 709/223 |
| 7,933,925 B2 * | 4/2011 | Sreedhar | 707/786 |
| 8,219,823 B2 * | 7/2012 | Carter | 713/182 |
| 2003/0005135 A1 * | 1/2003 | Inoue et al. | 709/229 |
| 2003/0081790 A1 * | 5/2003 | Kallahalla et al. | 380/281 |
| 2003/0126434 A1 * | 7/2003 | Lim et al. | 713/164 |
| 2003/0210790 A1 * | 11/2003 | Riedel et al. | 380/277 |
| 2004/0006621 A1 * | 1/2004 | Bellinson et al. | 709/225 |
| 2005/0204161 A1 * | 9/2005 | Caronni | 713/201 |
| 2005/0234832 A1 * | 10/2005 | Kanai | 705/57 |
| 2006/0069645 A1 | 3/2006 | Chen et al. | 705/51 |
| 2006/0271483 A1 * | 11/2006 | Ernst et al. | 705/51 |
| 2007/0055754 A1 * | 3/2007 | Robbin et al. | 709/223 |
| 2007/0174362 A1 * | 7/2007 | Pham et al. | 707/204 |
| 2007/0180496 A1 * | 8/2007 | Fransdonk | 726/3 |
| 2007/0256093 A1 | 11/2007 | Hiler | 725/28 |
| 2008/0126808 A1 * | 5/2008 | Price et al. | 713/183 |
| 2009/0025064 A1 * | 1/2009 | Kennedy | 726/4 |
| 2009/0164597 A1 * | 6/2009 | Shuster | 709/206 |
| 2009/0300712 A1 * | 12/2009 | Kaufmann et al. | 726/1 |

OTHER PUBLICATIONS

German Office Action for Application No. 10 2008 019 103.5 (2 pages), Jun. 10, 2009.

Fisk et al., "An Application of Social Filtering to Movie Recommendation", BT Technical Journal, Springer, Dordrecht, NL, vol. 14, No. 4 (10 pages), Oct. 1, 1996.

\* cited by examiner

METHOD AND DEVICE FOR TRANSCODING DURING AN ENCRYPTION-BASED ACCESS CHECK ON A DATABASE

CROSS-REFERENCE TO RELATED APPLICATIONS

This application is a U.S. National Stage Application of International Application No. PCT/EP2009/052893 filed Mar. 12, 2009, which designates the United States of America, and claims priority to DE Application No. 10 2008 019 103.5 filed Apr. 16, 2008. The contents of which are hereby incorporated by reference in their entirety.

TECHNICAL FIELD

The invention relates to a method and a device for transcoding in encryption-based access control of a plurality of client devices to a database.

BACKGROUND

Such a database can provide different datasets of different content in different encrypted areas. Examples of such provided datasets are dynamic data, such as e.g. streaming video or streaming audio data. These can be transmitted as a continuous data stream, what is referred to as a "media stream", from the database to a client or to a client device. The transmission of the continuous data stream takes place via an internet connection, for example. Text or image files would also be further examples of non-dynamic data.

In this case access to one or more of the encrypted areas can be permitted and consequently enabled for a specific group of clients or client devices.

The necessity for different access permissions for different groups of client devices, referred to as different access levels, arises for example as a result of statutory requirements which dictate that data provided via the internet must be classified, in particular in order to prevent unauthorized parties from accessing said data. An example of this is the well-known classification of video data or video films into FSK12, FSK16 or FSK18 and the like.

As far as the service provider of the datasets is concerned, the requirement for classification can also result from the provider's desire or responsibility to provide differentiated content to its different customers or customer communities.

Conventionally, the datasets requiring to be filtered or classified are filtered or classified offline on the server side prior to their transmission. This means disadvantageously that the entire content of the data must be filtered or classified before it can be made available for transmission in order to establish for which customer community or, as the case may be, for which clients belonging to a specific authorization, for example FSK16 or FSK18, specific datasets are to be or can be released.

To provide access control for the different client devices or groups of client devices there conventionally exists a central authority or instance, an application on a server of the database for example, which performs the filtering or classification of the datasets.

Disadvantageously, access control by the central authority or instance is static, i.e. the dataset is classified once in advance and subsequently retains its classification within the database.

SUMMARY

According to various embodiments, a dynamic, encryption-based access control to a database can be provided.

According to other embodiments, dynamic and cost-effective, encryption-based access control to a database can be provided.

According to an embodiment, a method for transcoding in encryption-based access control of at least one client device to a database which provides at least one dataset in at least one encrypted area, may comprise the steps of: a) assigning a specific access level to the respective client device and providing at least one corresponding first group key to the client device as a function of at least one registration parameter, wherein the client device is allowed access to a first area encrypted using the first group key and all areas of the database that are subordinate to the first area as a function of the assigned access level; b) classifying the respective dataset of the respective area by at least one of the client devices which is allowed access to said respective area, in order to provide a classification result; and c) transcoding the respective dataset and/or a dataset key for the respective dataset as a function of the respective classification result.

According to a further embodiment, the respective encrypted area may store at least one dataset classified for said area and/or at least one dataset key associated with the respective at least one dataset classified for said area. According to a further embodiment, the respective encrypted area may store the dataset key associated with the datasets classified for said area and the dataset keys associated with the datasets classified for the areas subordinate to said area. According to a further embodiment, the database can be hierarchically organized horizontally and/or vertically into a plurality of areas, with the client device being allowed access to the first area and all areas vertically assigned and horizontally subordinate to the first area as a function of the assigned access level. According to a further embodiment, the provided classification result can be used to determine the area to which the classified dataset is to be assigned and the corresponding group key by means of which the respective dataset and/or the dataset key of the respective dataset are/is transcoded. According to a further embodiment, in addition to the first group key for the first area the client device can also be provided with all the group keys of the areas subordinate to the first area. According to a further embodiment, the first area may store all the group keys of the areas that are subordinate to the first area. According to a further embodiment, the respective dataset and/or the dataset key associated with the respective dataset can be transcoded using a group key determined by means of the classification result. According to a further embodiment, the at least one registration parameter may include the age of the user of the client device, his/her name, the status assigned to him/her by an operator of the database, and/or his/her position within an organization operating or maintaining the database. According to a further embodiment, different areas of a common horizontal level of the database can be assigned to an identical access level and/or different areas of a common vertical level of the database can be assigned to an identical subject area. According to a further embodiment, a respective dataset can be assigned a specific access level and consequently a specific area, the client devices which are allowed access to said respective area being provided with a selection of access levels for classification purposes. According to a further embodiment, the respective client device can be provided with a means with the aid of which said device is suitable for casting a predetermined number of votes for the selection of the provided access levels made by the client device as a function of a trust level assigned to the respective client device. According to a further embodiment, a threshold value can be predetermined for each of the selection of the access levels, the respective dataset being classified with the access level for which the votes cast by the client devices reach the predetermined threshold value. According to a further embodiment, the number of votes of the respective client devices can be assigned as a function of their respective access level. According to a further embodiment, the number of votes of the respective client device can be assigned as a function of its previous voting behavior. According to a further embodiment, the client devices to which the highest access level is assigned can be equipped with a means with the aid of which an access level provided for the selection can be blocked. According to a further embodiment, the dataset may have dynamic data which is suitable for being transmitted as a continuous data stream from the database to the respective client device.

According to another embodiment, a computer program product may initiate the performance of a method as described above on a program-controlled appliance.

According to yet another embodiment, a device for transcoding in encryption-based access control of at least one client device to a database which provides at least one dataset in at least one encrypted area, may comprise: a) a first means for assigning a specific access level to the respective client device and for providing at least one corresponding first group key to the client device as a function of at least one registration parameter, wherein the client device is allowed access to a first area encrypted using the first group key and all areas of the database that are subordinate to the first area as a function of the assigned access level; b) a second means for providing a classification result as a function of a classification of the respective dataset of the respective area by at least one of the client devices which is allowed access to said respective area; and c) a third means for transcoding the respective dataset and/or a dataset key for the respective dataset as a function of the respective classification result. According to a further embodiment of the device, the device may be arranged in a client-server architecture. According to a further embodiment of the device, the device may be arranged in a decentralized architecture or in a peer-to-peer network. According to a further embodiment of the device, the device may be arranged between the client device and the database.

BRIEF DESCRIPTION OF THE DRAWINGS

The invention will be explained in more detail below with reference to the exemplary embodiments disclosed in the thematic figures, in which.

DETAILED DESCRIPTION

Accordingly a method for transcoding in encryption-based access control of at least one client device to a database is proposed which provides at least one dataset in at least one encrypted area, the method comprising the following steps of:

preferably encrypting a dataset at the time of its first being provided and assigning a specific access level to the respective client device and providing at least one corresponding first group key which encrypts the data at said access level. The group key is made available to the client device as a function of at least one registration parameter, the client device being allowed access to a first area encrypted using the first group key and to all areas of the database that are subordinate to the first area as a function of the assigned access level.

classifying the respective dataset of the respective area by at least one of the client devices which are allowed access to said respective area, in order to provide a classification result; and transcoding the respective dataset and/or a dataset key for the respective dataset as a function of the respective classification result.

Also proposed is a device for transcoding in encryption-based access control of at least one client device to a database which provides at least one dataset in at least one encrypted area, the device having:

a first means for assigning a specific access level to the respective client device and for providing at least one corresponding first group key to the client device as a function of at least one registration parameter, the client device being allowed access to a first area encrypted using the first group key and all areas of the database that are subordinate to the first area as a function of the assigned access level;

a second means for providing a classification result as a function of a classification of the respective dataset of the respective area by at least one of the client devices which is allowed access to said respective area; and a third means for transcoding the respective dataset and/or a dataset key for the respective dataset as a function of the respective classification result.

An essential aspect of the various embodiments lies in the combination of the classification or rating of the datasets by the users, clients or client devices and the transcoding of the datasets or their dataset key. This enables the encryption-based access control to the database to be implemented as a function of the classification performed by the client devices which is not restricted to a specific time or timeframe. The encryption-based access control according to various embodiments is therefore dynamic. Because the classification is performed by the client devices it is also decentralized and independent of a central classification authority or instance. Moreover this also minimizes the probability of an unintentional misclassification according to the standard of a specific group of users or the society of users.

Furthermore the encryption-based access control according to various embodiments is more secure because an attacker or hacker would have to simulate a plurality of individuals or clients in order to achieve a misclassification.

Furthermore the encryption-based access control according to various embodiments is also cost-effective because the classification load can be distributed over a plurality of client devices.

A further advantage of the various embodiments lies in the fact that a more democratic access control can be achieved as a result of the decentralized classification.

Furthermore the possibility of censorship is also minimized because many different clients or client devices can decide collectively about a specific content or dataset, in particular to which of the encrypted areas of the database it is to be assigned by means of a transcoding. The maintaining of a blacklist by an authority or instance connected upstream of the database is also no longer necessary according to various embodiments.

Transcoding in this context means a decrypting of an encrypted dataset or a dataset key associated with the encrypted dataset and a re-encrypting of the respective dataset using a new, different encryption key. The result of the transcoding is that the transcoded dataset or the transcoded dataset key is henceforth only accessible using the new encryption key.

The database can exist either as a classical client-server solution or else have a decentralized structure, e.g. be implemented as a peer-to-peer network. Particularly in distributed databases such as peer-to-peer networks it may not be possible to set up a central filter or classification device. The various embodiments can be used for this case in particular.

According to an embodiment the respective encrypted area stores at least one dataset classified for said area and/or at least one dataset key associated with the respective at least one dataset classified for said area.

According to another embodiment the respective encrypted area stores the dataset keys associated with the datasets classified for said area and the dataset keys associated with the datasets classified for the areas subordinate to said area.

According to an embodiment the database is hierarchically organized horizontally and/or vertically into a plurality of areas, with the client device being allowed access to the first area and all areas vertically assigned and horizontally subordinate to the first area as a function of the assigned access level.

According to another embodiment the provided classification result is used to determine the area to which the classified dataset is to be assigned and the corresponding group key by means of which the respective dataset and/or the dataset key of the respective dataset is transcoded.

According to another embodiment, in addition to the first group key for the first area the client device is also provided with all the group keys of the areas that are subordinate to the first area.

According to another embodiment the first area stores all the group keys of the areas that are subordinate to the first area.

According to another embodiment the respective dataset and/or the dataset key associated with the respective dataset are/is transcoded using a group key determined by means of the classification result.

According to another embodiment the at least one registration parameter includes the age of the user of the client device, his/her name, the status assigned to him/her by an operator of the database, and/or his/her position within an organization operating or maintaining the database. The organization can be a commercial enterprise, for example.

According to another development different areas of a common horizontal level of the database are assigned to an identical access level. In addition or alternatively different areas of a common vertical level of the database can be assigned to an identical subject area.

According to another embodiment a respective dataset is assigned a specific access level and consequently a specific area, the client devices which are allowed access to said respective area being provided with a selection of access levels for classification purposes.

According to another development the respective client device is provided with a means with the aid of which said device is made suitable for casting a predetermined number of votes for the selection of the provided access levels made by the client device as a function of a trust level assigned to the respective client device.

According to another embodiment a threshold value is predetermined for each selection of the access levels, the respective dataset being classified with the access level for which the votes cast by the client devices reach the predetermined threshold value.

According to another embodiment the number of votes of the respective client devices are assigned as a function of their respective access level.

According to another embodiment the number of votes of the respective client device are assigned as a function of its previous voting behavior.

According to another embodiment the client devices to which the highest access level is assigned are equipped with a means with the aid of which an access level provided for the selection can be blocked.

According to another embodiment the dataset has dynamic data which is suitable for transmission as a continuous data stream from the database to the respective client device.

According to another embodiment the dataset can also remain unencrypted when provided for the first time at the lowest access level.

Also proposed is a computer program product which initiates the performance of a method according to various embodiments as described above on a program-controlled appliance.

A computer program product such as a computer program means can be provided or supplied for example as a storage medium, such as a memory card, USB stick, floppy disk, CD stick, CD-ROM, DVD, or else in the form of a downloadable file from a server in a network. For example, this can be effected in a wireless communications network by the transmission of a corresponding file containing the computer program product or computer program means.

Unless expressly stated otherwise, identical or functionally identical means and devices are labeled by the same reference signs in all the figures.

Figure 1:
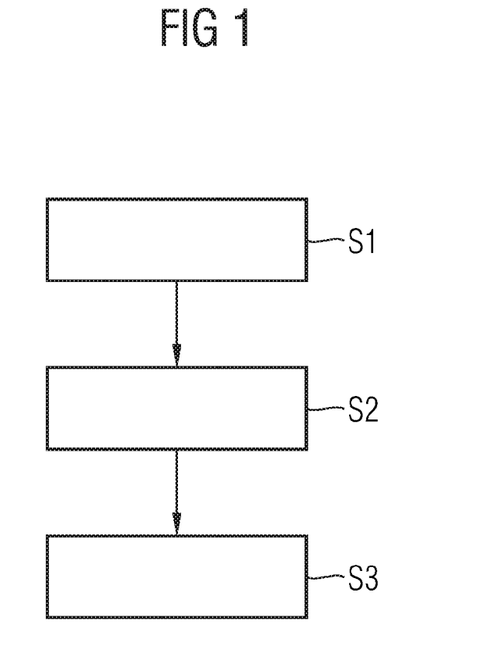
FIG. 1 shows a schematic flow diagram of an exemplary embodiment of the method.

FIG. 1 shows a schematic flow diagram of an exemplary embodiment of the method according to various embodiments for transcoding in encryption-based access control of at least one client device 20 to a database DB. The database DB provides at least one dataset D1-D4 in at least one encrypted area B1, B2.

The method according to various embodiments is explained below with the aid of a block diagram shown in FIG. 1 with reference to the block diagram shown in FIG. 9. The method according to FIG. 1 has the method steps S1-S3:

Method Step S1:

The respective client device 20 is assigned a specific access level L1, L2 as a function of at least one registration parameter A1 or a user profile having a plurality of registration parameters A1. The client device 20 is also assigned a corresponding first group key G1. The client device 20 is allowed access to a first area B1 encrypted using the first group key G1 and all areas B2, B3 of the database DB that are subordinate to said first area B1 as a function of the assigned access level L1.

The at least one registration parameter A1 includes, for example, the age of the user of the client device 20, his/her name, the status assigned to him/her by an operator of the database DB, and/or his/her position within an organization operating or maintaining the database DB. In particular a user profile consisting of a plurality of registration parameters A1 can also be used.

Method Step S2:

In order to provide a classification result R, the respective dataset D1-D4 of the respective area B1, B2 is classified by at least one of the client devices 20 which are allowed access to said respective area B1, B2.

Method Step S3:

The respective dataset D1-D4 and/or a dataset key K1-K4 for the respective dataset D1-D4 are/is transcoded as a function of the respective classification result R.

Figure 2:
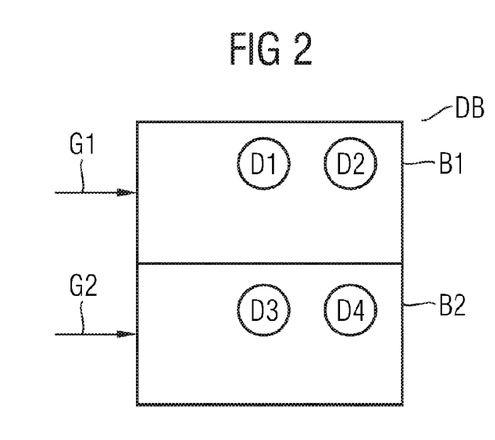
FIG. 2 shows a schematic block diagram of a first exemplary embodiment of a database having different encrypted areas.

FIG. 2 shows a schematic block diagram of a first exemplary embodiment of a database DB having different encrypted areas B1, B2. In this case access is allowed to a first area B1 at a first access level L1 and consequently by means of a first group key G1. Access to the second area B2 subordinate to said first area B1 is enabled by means of a second group key G2. The first area B1 stores the datasets D1 and D2, for example, while the second area stores the datasets D3 and D4, for example.

Figure 3:
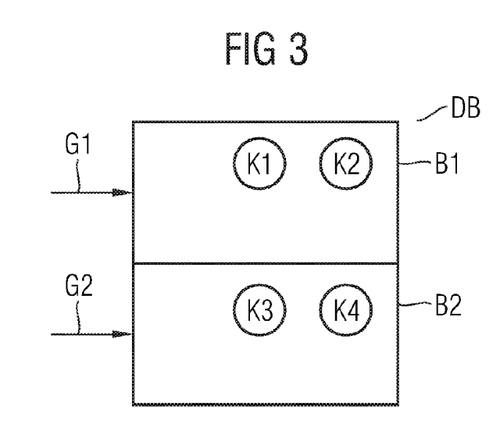
FIG. 3 shows a schematic block diagram of a second exemplary embodiment of a database having different encrypted areas.

Alternatively—as shown in FIG. 3—the first area B1 can store a first dataset key K1 for the first dataset D1 and a second dataset key K2 for the second dataset D2. Similarly, the second area B2 can store a third dataset key K3 for the third dataset D3 and a fourth dataset key K4 for the fourth dataset D4.

A client device 20 to which the highest access level L1 is assigned can access the first encrypted area B1 using the first group key G1, for example, and consequently receives the two dataset keys K1 and K2 for the first and second dataset D1, D2. Furthermore it is also made possible for said client device 20 having the highest access level L1 to access the second area D2. In this case there exist, for example, the possibilities of providing said client device 20 having the highest access level L1 with the second group key G2 or of storing the second group key G2 in the first area B1 (not shown).

Figure 4:
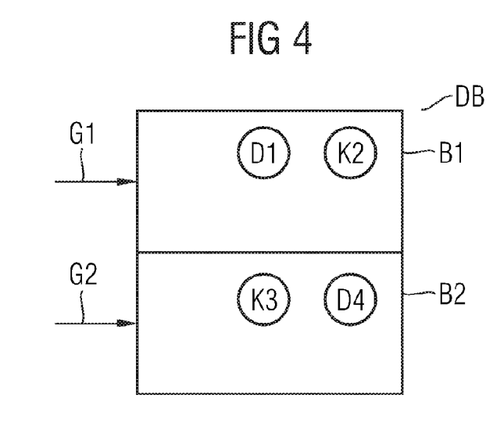
FIG. 4 shows a schematic block diagram of a third exemplary embodiment of a database having different encrypted areas.

FIG. 4 shows a schematic block diagram of a third exemplary embodiment of a database DB having different encrypted areas B1 and B2. In this case the exemplary embodiment according to FIG. 4 constitutes a hybrid form of the exemplary embodiments according to FIGS. 2 and 3, wherein the respective area B1, B2 stores and provides both a dataset D1 and D4, respectively, and a dataset key K2 and K3, respectively.

Figure 5:
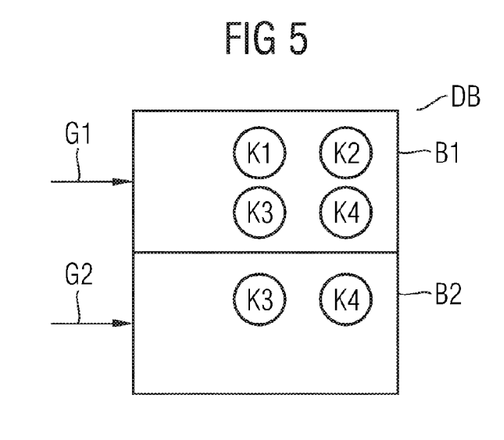
FIG. 5 shows a schematic block diagram of a fourth exemplary embodiment of a database having different encrypted areas.

FIG. 5 shows a schematic block diagram of a fourth exemplary embodiment of a database DB having different encrypted areas B1, B2. In this case said fourth exemplary embodiment of the database DB shows the possibility that the respective encrypted area, for example the first area B1, stores the dataset keys K1, K2 associated with the datasets D1 and D2 classified for said first area B1 and in addition the dataset keys K3, K4 associated with the datasets D3, D4 classified for the area B2 subordinate to the first area B1.

Figure 6:
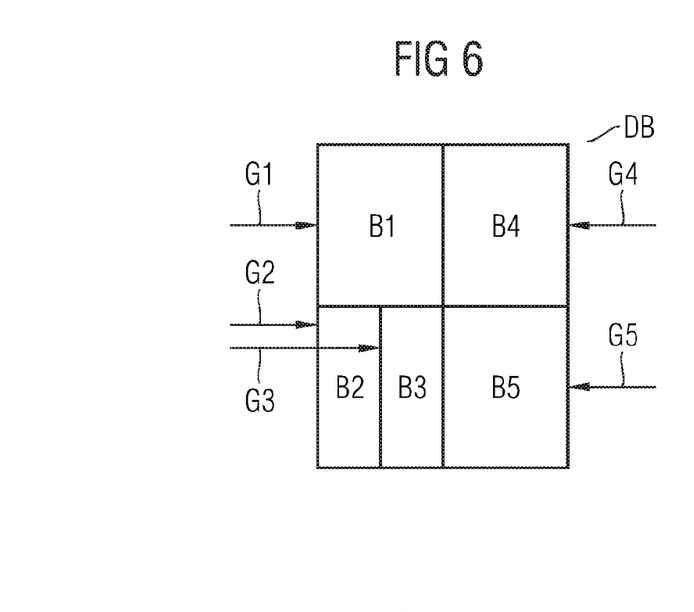
FIG. 6 shows a schematic block diagram of a fifth exemplary embodiment of a database having different encrypted areas.

FIG. 6 shows a schematic block diagram of a fifth exemplary embodiment of a database DB having different encrypted areas B1-B5. The database DB according to FIG. 6 is hierarchically organized horizontally and vertically into a plurality of areas B1-B5. In this arrangement the first area B1 and the fourth area B4 have the higher access level L1 and the areas B2, B3 and B5 the lower access level L2. For example, a client device 20 equipped with the first group key G1 is allowed access to the first area B1, the second area B2 and the third area B3. Similarly, a client device 20 equipped with the fourth group key G4 is allowed access to the fourth area B4 and the fifth area B5.

Figure 7:
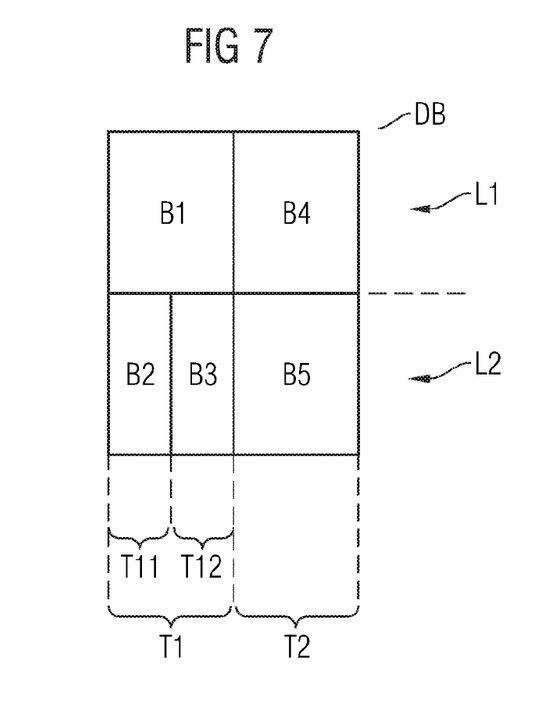
FIG. 7 shows a schematic block diagram of a sixth exemplary embodiment of a database having different encrypted areas.

In addition FIG. 7 shows the possibility that different areas B1, B4; B2, B3, B5 of a common horizontal level of the database DB are assigned an identical access level L1, L2, and different areas B1, B2, B3; B4, B5 of a common vertical level of the database DB are assigned to an identical subject area T1, T2.

For example, the first area B1 and the fourth area B4 are arranged on a first horizontal level of the database DB. The second area B2, the third area B3 and the fifth area B5 are arranged on a second horizontal level subordinate to the first level.

Furthermore the areas B1-B3 belong to a first subject area T1 and the areas B4, B5 to a second subject area T2.

If, for example, the areas B1-B5 provide video films, the first subject area T1 can be the subject area Comic and the second subject area T2 can be the subject area Western, for example. The two access levels L1 and L2 can represent FSK 12 and FSK 6, for example. Furthermore, subsidiary subject areas T11 and T12, for example, are also possible for the second area B2 and the third area B3. In this case the first subsidiary subject area T11 can be, for example, Fairy Tale-Comic and the second subsidiary subject area T12 Animal-Comic.

Figure 8:
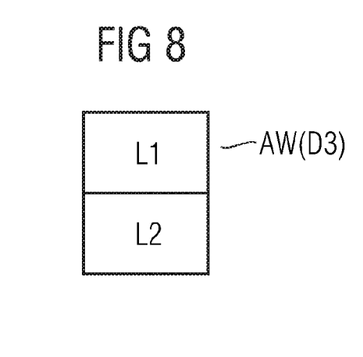
FIG. 8 shows a schematic block diagram of an exemplary embodiment of a selection of access levels for a classifying client device.

FIG. 8 shows a schematic block diagram of an exemplary embodiment of a selection of access levels L1, L2 for a classifying client device 20 by means of which the client device 20 can carry out its classification of the respective dataset D1-D4. For example, FIG. 8 shows the selection AW(D3) for the third dataset D3. According to FIG. 8 the client device 20 can choose between the first access level L1 and the second access level L2 for the third dataset D3. The consequences of the classification and the potential transcoding are explained in detail with reference to FIG. 9.

For example, a threshold value can be predetermined for each access level L1, L2 of the selection AW(D3). The third dataset D3 is preferably classified with the access level L1, for which the votes ST cast by the client devices 20 reach the predetermined threshold value. According to the example shown in FIG. 9 the third dataset D3 is assigned from the second area B2 to the higher first area B1 by means of the first group key G1.

The number of votes ST assigned to the respective client device 20 can be determined as a function of its respective access level L1, L2.

In addition or alternatively the number of votes ST can be assigned to the respective client device 20 as a function of its previous voting behavior. For example, the number of votes ST provided to a specific client device 20 which consistently exhibits a different voting behavior from the majority of the client devices 20 can be reduced.

Furthermore it is possible to provide the client devices 20 which are assigned the highest access level L1 with a means with the aid of which an access level L1, L2 provided for the selection AW(D3) can be blocked.

Preferably the respective client device 20 is provided with a means with the aid of which said device is suitable for casting a predetermined number of votes ST for the selection AW(D3) made by the client device 20 of the provided access levels L1, L2 as a function of a trust level assigned to the respective client device 20. The assignment of the trust level can be determined as a function of the at least one registration parameter A1 or can be determined by the operator of the database DB.

Figure 9:
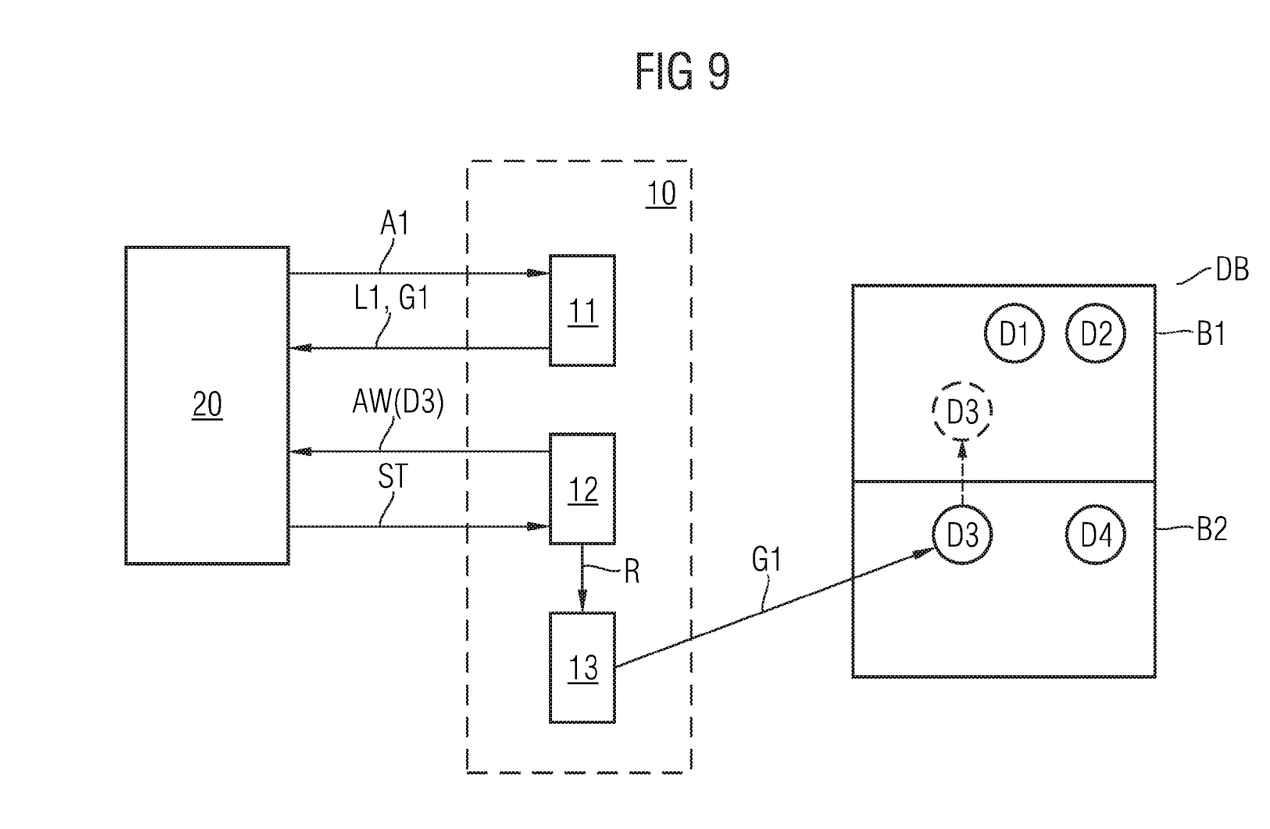
FIG. 9 shows a schematic block diagram of an exemplary embodiment of the device.

FIG. 9 shows a schematic block diagram of an exemplary embodiment of the device 10 for encrypting and transcoding in encryption-based access control of at least one client device 20 to a database DB which provides at least one dataset D1-D4 in at least one encrypted area B1, B2.

The device 10 according to various embodiments has a first means 11, a second means 12 and a third means 13.

The first means 11 is suitable for assigning a specific access level L1, L2 to the respective client device 20 as a function of at least one registration parameter A1. The first means 11 is also suitable for providing the respective client device 20 with at least one corresponding first group key G1. Then the respective client device is allowed access to a first area encrypted using the first group key G1 and to all areas B2 of the database DB that are subordinate to the first area B1 as a function of the assigned access level L1, L2.

The second means 12 is suitable for providing a respective classification result R as a function of a classification of the respective dataset D1-D3 of the respective area B1, B2 by at least one of the client devices 20 which are allowed access to said respective area B1, B2. According to the example shown in FIG. 9 the third dataset D3 is classified. The respective client device 20 casts its votes ST for said classification, which votes are received by the second means 12. Without restricting generality, only a single client device 20 is shown in FIG. 9. The number of client devices 20 which classify a respective dataset, for example the third dataset D3, is limited only by the constraint that said client devices 20 must have access to said respective area, in this case the second area B2. According to the example shown in FIG. 9 these are all the client devices 20 that are assigned to the first access level L1 or the second access level L2.

Accordingly these are all the client devices 20 that have access to the database DB.

However, only such client devices 20 that are assigned to the first access level L1 are configured for a classification of the first and second datasets D1, D2 assigned to the first area B1.

In the above exemplary embodiments the first area B1 is in each case the one having the highest access level L1. This is only by way of example, since the respective first area is the area which is assigned to the respective client device 20 and to which the respective client device has access in addition to the areas subordinate to said first area.

What is claimed is:

1. A computer-implemented method for transcoding in encryption-based access control of a plurality of client devices to a database which provides at least one dataset in at least one of a plurality of encrypted areas having different access levels, the method comprising:

using a processing device programmed to assign a specific access level to a client device and providing at least one corresponding first group key to the client device as a function of at least one registration parameter associated with a user of the client device, wherein the access level assigned to the client device allows the client device access to a first encrypted area that is encrypted using the first group key and all other encrypted areas of the database that are subordinate to the first encrypted area;

for a respective dataset, receiving at the processing device from at least one of the plurality of client devices a number of votes for a selection of at least one of the encrypted areas for classifying the respective dataset;

using the processing device programmed to classify the respective dataset into one of the plurality of encrypted areas based on the collective votes received from the at least one client device, in order to provide a classification result; and using the processing device programmed to transcode the respective dataset and/or a dataset key for the respective dataset as a function of the classification result, wherein the transcoding comprises decrypting the respective dataset and/or dataset key and re-encrypting with a new group key determined as a function of the classification result based on the collective votes received from the at least one client device regarding the respective dataset.

2. The method according to claim 1, wherein the first area stores at least one of at least one dataset classified for said first area and at least one dataset key associated with the respective at least one dataset classified for said area.

3. The method according to claim 2, wherein the first area stores the dataset key associated with the datasets classified for said first area and the dataset keys associated with the datasets classified for the areas subordinate to said first area.

4. The method according to claim 1, wherein the database is hierarchically organized at least one of horizontally and vertically into a plurality of areas, with the client device being allowed access to the first area and all areas vertically assigned and horizontally subordinate to the first area as a function of the assigned access level.

5. The method according to claim 1, wherein the provided classification result is used to determine the area to which the classified dataset is to be assigned and the corresponding group key by means of which at least one of the respective dataset and the dataset key of the respective dataset is transcoded.

6. The method according to claim 1, wherein in addition to the first group key for the first area the client device is also provided with all the group keys of the areas subordinate to the first area.

7. The method according to claim 1, wherein the first area stores all the group keys of the areas that are subordinate to the first area.

8. The method according to claim 1, wherein at least one of the respective dataset and the dataset key associated with the respective dataset is transcoded using a group key determined by means of the classification result.

9. The method according to claim 1, wherein the at least one registration parameter includes at least one of: the age of the user of the client device, his/her name, the status assigned to him/her by an operator of the database, and his/her position within an organization operating or maintaining the database.

10. The method according to claim 4, wherein at least one of different areas of a common horizontal level of the database are assigned to an identical access level and different areas of a common vertical level of the database are assigned to an identical subject area.

11. The method according to claim 1, wherein a respective dataset is assigned a specific access level and consequently a specific area, the client devices which are allowed access to said respective area being provided with a selection of access levels for classification purposes.

12. The method according to claim 11, wherein the respective client device is provided with a means with the aid of which said device is suitable for casting a predetermined number of votes for the selection of the provided access levels made by the client device as a function of a trust level assigned to the respective client device.

13. The method according to claim 11, wherein a threshold value is predetermined for each of the selection of the access levels, the respective dataset being classified with the access level for which the votes cast by the client devices reach the predetermined threshold value.

14. The method according to claim 11, wherein the number of votes of the respective client devices are assigned as a function of their respective access level.

15. The method according to claim 11, wherein the number of votes of the respective client device are assigned as a function of its previous voting behavior.

16. The method according to claim 11, wherein the diem devices to which the highest access level is assigned are equipped with a means with the aid of which an access level provided for the selection can be blocked.

17. The method according to claim 1, wherein the dataset has dynamic data which is suitable for being transmitted as a continuous data stream from the database to the respective client device.

18. A device for transcoding in encryption-based access control of a plurality of client devices to a database which provides at least one dataset in at least one of a plurality of encrypted areas having different access levels, the device comprising:
   a processing device; and
   computer instructions stored in non-transitory computer-readable media and executable by the processing device to perform an algorithm including:
      assigning a specific access level to a client device and for providing at least one corresponding first group key to the client device as a function of at least one registration parameter associated with a user of the client device, wherein the access level assigned to the client device allows the client device access to a first encrypted area that is encrypted using the first group key and all other encrypted areas of the database that are subordinate to the first encrypted area;
      for a respective dataset, receiving from each of at least one of the plurality of client devices a number of votes for a selection of at least one of the encrypted areas for classifying the respective dataset;
      providing a classification result for classifying the respective dataset into one of the plurality of encrypted areas as a function of the collective votes received from the at least one client device; and
      transcoding the dataset and/or a dataset key for the dataset as a function of the classification result, wherein the transcoding comprises decrypting the respective dataset and/or dataset key and re-encrypting with a new group key determined as a function of the classification result based on the collective votes received from the at least one client device regarding the respective dataset.

19. The device according to claim 18, wherein the device is arranged in a client-server architecture.

20. The device according to claim 18, wherein the device is arranged in a decentralized architecture or in a peer-to-peer network.

21. The device according to claim 18, wherein the device is arranged between the client device and the database.

* * * * *